US012633597B2

(12) United States Patent
Wu et al.

(10) Patent No.: US 12,633,597 B2
(45) Date of Patent: May 19, 2026

(54) BATTERY AND ELECTRONIC DEVICE

(71) Applicant: AESC JAPAN LTD., Kanagawa (JP)

(72) Inventors: Changjun Wu, Jiangsu (CN); Zhuolie Chen, Jiangsu (CN); Xin Cui, Jiangsu (CN); Yafei He, Jiangsu (CN)

(73) Assignee: AESC JAPAN LTD., Kanagawa (JP)

( * ) Notice: Subject to any disclaimer, the term of this patent is extended or adjusted under 35 U.S.C. 154(b) by 702 days.

(21) Appl. No.: 18/086,602

(22) Filed: Dec. 21, 2022

(65) Prior Publication Data

US 2024/0030520 A1     Jan. 25, 2024

(30) Foreign Application Priority Data

Jul. 20, 2022   (CN) .......................... 202221884272.9
Jul. 20, 2022   (CN) .......................... 202221884287.5

(51) Int. Cl.
| | |
|---|---|
| *H01M 10/658* | (2014.01) |
| *H01M 50/103* | (2021.01) |
| *H01M 50/164* | (2021.01) |
| *H01M 50/342* | (2021.01) |
| *H01M 50/627* | (2021.01) |
| *H01M 50/14* | (2021.01) |
| *H01M 50/15* | (2021.01) |

(Continued)

(52) U.S. Cl.
CPC ....... *H01M 10/658* (2015.04); *H01M 50/103* (2021.01); *H01M 50/164* (2021.01); *H01M 50/3425* (2021.01); *H01M 50/627* (2021.01); *H01M 50/14* (2021.01); *H01M 50/15* (2021.01); *H01M 50/176* (2021.01); *H01M 50/394* (2021.01); *Y02E 60/10* (2013.01)

(58) Field of Classification Search
CPC .. H01M 10/658; H01M 50/103; H01M 50/14; H01M 50/15; H01M 50/164; H01M 50/176; H01M 50/3425; H01M 50/394; H01M 50/627; Y02E 60/10
See application file for complete search history.

(56) References Cited

U.S. PATENT DOCUMENTS

| | | | |
|---|---|---|---|
| 2010/0233520 A1* | 9/2010 | Suzuki | ................ H01M 50/121 |
| | | | 429/56 |
| 2012/0015219 A1* | 1/2012 | Wang | ................ H01M 50/3425 |
| | | | 429/53 |
| 2012/0219834 A1 | 8/2012 | Park | |

(Continued)

FOREIGN PATENT DOCUMENTS

| | | |
|---|---|---|
| CN | 114497876 | 5/2022 |
| EP | 4071912 | 10/2022 |

(Continued)

OTHER PUBLICATIONS

"Office Action of Japan Counterpart Application", issued on Mar. 22, 2024, with English translation thereof, p. 1-p. 6.

(Continued)

*Primary Examiner* — Lingwen R Zeng
(74) *Attorney, Agent, or Firm* — JCIPRNET

(57) ABSTRACT

A battery and an electronic device are provided. The battery includes a case having an opening, a battery core disposed in the case, and a cover covering the opening of the case. The cover includes a cover body provided with a first hole and a high temperature resistant sheet disposed on a top of the cover body and covering the first hole.

17 Claims, 9 Drawing Sheets

(51) Int. Cl.
    *H01M 50/176*          (2021.01)
    *H01M 50/30*           (2021.01)

(56)                  References Cited

U.S. PATENT DOCUMENTS

2021/0296625  A1 *   9/2021   Li  ....................... H01M 50/124
2023/0327272  A1     10/2023  Xu et al.

FOREIGN PATENT DOCUMENTS

| | | |
|---|---|---|
| JP | 2011060600 | 3/2011 |
| JP | 2015115280 | 6/2015 |
| WO | 2022109884 | 6/2022 |

OTHER PUBLICATIONS

"Search Report of Europe Counterpart Application", issued on Dec. 11, 2023, p. 1-p. 8.

* cited by examiner

300

BATTERY AND ELECTRONIC DEVICE

CROSS-REFERENCE TO RELATED APPLICATION

This application claims the priority benefit of China application serial no. 202221884287.5, filed on Jul. 20, 2022 and China application serial no. 202221884272.9, filed on Jul. 20, 2022. The entirety of each of the above-mentioned patent applications is hereby incorporated by reference herein and made a part of this specification.

BACKGROUND

Technical Field

The invention relates to the technical field of batteries, and particularly, to a battery and an electronic device.

Description of Related Art

In recent years, the rapid rise of new energy vehicles has brought great impetus to the sustainable development of society and the harmonious coexistence of human beings and the environment. Among various conceptual new energy vehicles, electric vehicles have been mass-produced technically and received more and more attention and favor with the support of the government. As a solution to energy and environmental issues, the key technology in electric vehicles is to replace the rechargeable battery pack used by gasoline engines as power sources.

SUMMARY

The invention aims to provide a battery and an electronic device, which can ensure the overall safety and stability of the battery and further prolong the service life.

To solve the technical problems, the embodiments of the invention provide a battery, including: a case, having an opening; a battery core disposed in the case; and a cover, covering the opening of the case. The cover includes a cover body provided with a first hole and a high temperature resistant sheet disposed on the top of the cover body and covering the first hole.

Compared with the conventional technology, the embodiments of the invention are configured with a high temperature resistant sheet on the cover body of the battery, and the high temperature resistant sheet covers the cover body, so high temperature substances of other batteries can be prevented from entering through the first hole, and thereby in the case of thermal runaway of one battery, other batteries are prevented from being affected without causing chain thermal runaway, and the probability of thermal runaway diffusion is reduced.

BRIEF DESCRIPTION OF THE DRAWING

One or more embodiments are illustrated with reference to the figures in the corresponding drawings, and these illustrations do not constitute limitations to the embodiments, and elements with the same reference numerals in the drawings are denoted as similar elements, unless otherwise stated, the figures in the accompanying drawings do not constitute a scale limitation.

DESCRIPTION OF THE EMBODIMENTS

Figure 1:
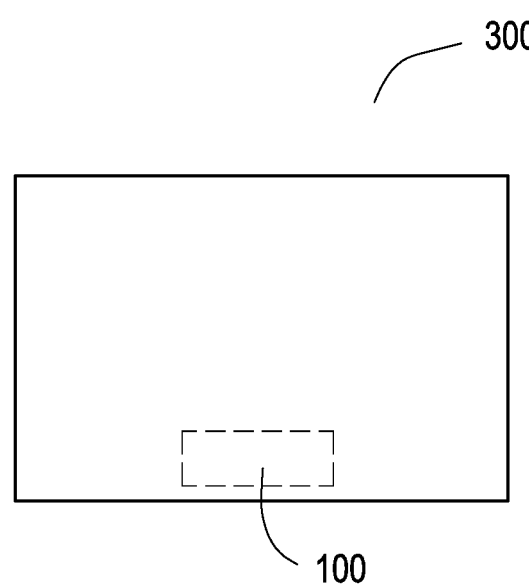
FIG. 1 is a schematic structural view of an electronic device according to an embodiment of the invention.

For the clarity of the objectives, technical solutions and advantages of the embodiments of the invention, various embodiments of the invention will be described in detail below with reference to the accompanying drawings. However, those of ordinary skill in the art shall understand in the various embodiments of the invention, many technical details are set forth for the reader to better understand the present application. However, even without these technical details and various changes and modifications based on the following embodiments, the technical solutions claimed in the present application can be implemented.

In the following description, for the purpose of illustrating various disclosed embodiments, certain specific details are set forth in order to provide a thorough understanding of the various disclosed embodiments. However, those of ordinary skill in the art shall recognize that the embodiments may be implemented without one or more of these specific details. In other instances, well-known devices, structures and technologies associated with the application may not be illustrated or described in detail to avoid unnecessarily obscuring the description of the embodiments.

Unless the context requires otherwise, throughout the specification and claims, the term "comprising" and the variations thereof, such as "including" and "having", should be interpreted in an open and inclusive sense, i.e., should be interpreted as "including, but not limited to".

The embodiments of the invention will be described in detail below with reference to the accompanying drawings, so as to more clearly understand the objectives, features and advantages of the invention. It should be understood that the embodiments shown in the accompanying drawings are not intended to limit the scope of the invention but are only intended to illustrate the essential spirit of the technical solutions of the invention.

Reference throughout the specification to "one embodiment" or "an embodiment" means that a specific feature, structure, or quality described in connection with the embodiment is included in at least one embodiment. Thus, when "in one embodiment" or "in an embodiment" is mentioned in various paragraphs throughout the specification, it is not necessarily to refer to the same embodiment. Additionally, the specific feature, structure or quality may be combined in any manner in one or more embodiments.

As used in the specification and the claims, the singular forms "a" and "the" include plural antecedents unless the context clearly dictates otherwise. It should be noted that the term "or" is generally used in its sense including "and/or" unless the content clearly dictates otherwise.

In the following description, to clearly demonstrate the structure and working of the invention, various directional words will be used for illustration, but terms such as "front", "rear", "left", "right", "outside", "inside", "outward", "inward", "up", "down", and the like are interpreted as convenient terms rather than limiting terms.

The conventional rechargeable battery pack has multiple batteries, and the batteries are connected in a case through an appropriate series-parallel structure. Such a design can not only meet the relatively high energy density requirements of electric vehicles but can also flexibly adjust the series-parallel mode in the battery according to the different design requirements of various vehicles, and this comes with high practicability. However, when thermal runaway occurs to a battery in a battery pack, the high-temperature substances emitted by the battery may affect other batteries, resulting in other batteries to also experience thermal runaway, which in turn leads to thermal runaway of the entire battery pack, leading to fires and other situations.

In the subsequent paragraphs, an embodiment of the invention is illustrated with reference to the accompanying drawings. An embodiment of the invention provides an electronic device 300. As shown in FIG. 1, the electronic device 300 can be an electric vehicle or an electric motorcycle, etc. The electronic device 300 includes a battery 100, and the number of the battery 100 can be singular or plural. The specific embodiment of the battery 100 is illustrated in detail with reference to the accompanying drawings in the subsequent paragraphs.

Figure 2:
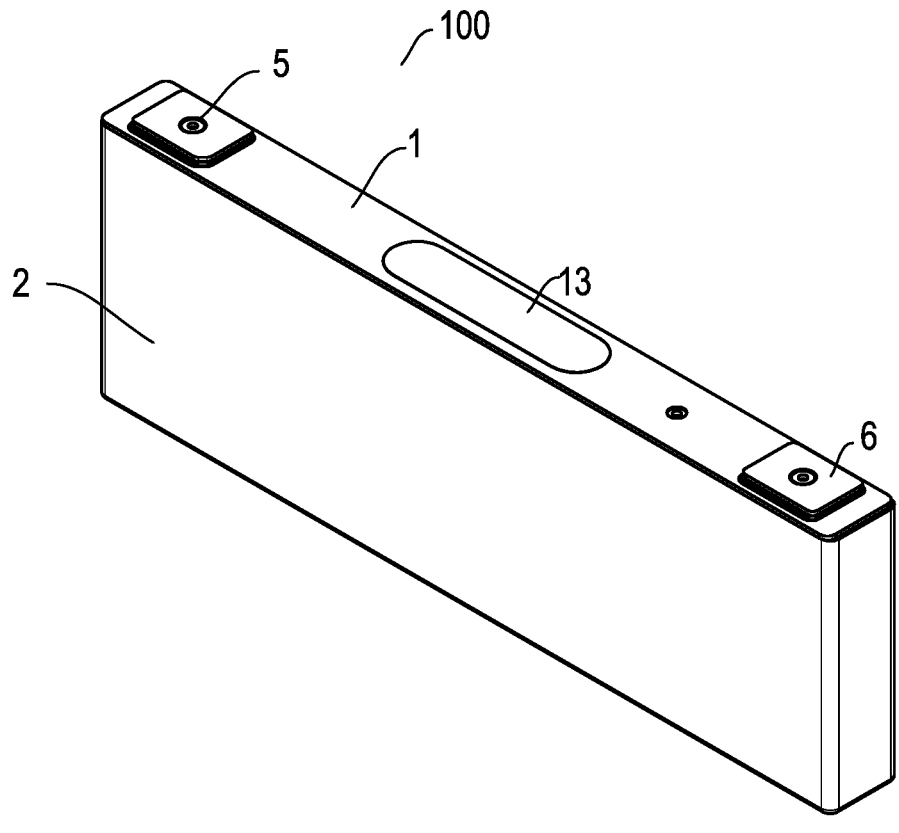
FIG. 2 is a schematic structural view of a battery according to an embodiment of the invention.
Figure 3:
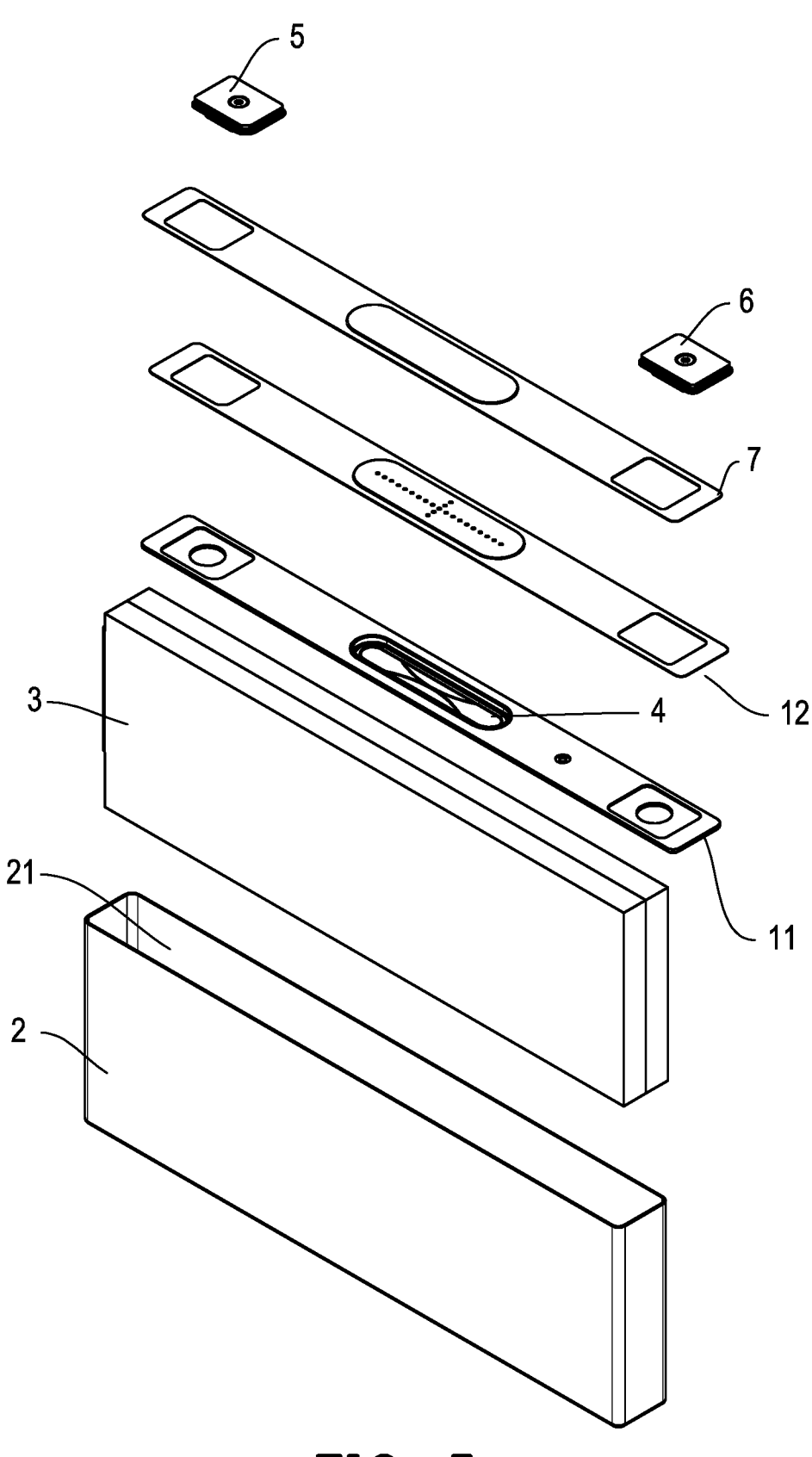
FIG. 3 is an exploded view of a battery according to an embodiment of the invention.

In one embodiment, FIG. 2 illustrates an assembly of the battery 100, and FIG. 3 illustrates an exploded view of the battery 100. As shown in FIG. 2 and FIG. 3, the battery 100 includes a cover 1 and a case 2 with an upper opening 21. The cover 1 is disposed at the opening 21 of the case 2 and seals the opening 21. The cover 1 includes a cover body 11 and a high temperature resistant sheet 12, and the shape of the cover body 11 matches the shape of the opening 21 of the case 2. In the embodiment, the case 2 is illustrated as a rectangular box, so the cover body 11 is adaptively formed into a long strip. Those skilled in the art should understand that when the case 2 of the battery is formed into other shapes, the shape of the cover body 11 can also be correspondingly formed into the other shapes as long as the cover body 11 can seal the opening 21 of the case 2. Multiple battery cores 3 are disposed in the sealed space defined by the case 2 and the cover 1. The battery cores 3 are placed in close arrangement inside the case 2 and are electrically connected to one another to form a charging and discharging component of the battery pack.

Note that when in the shape of a rectangular box, the case 2 may have openings at two ends in the longitudinal direction, and meanwhile the cover 1 may cover the openings at the two ends.

Figure 4:
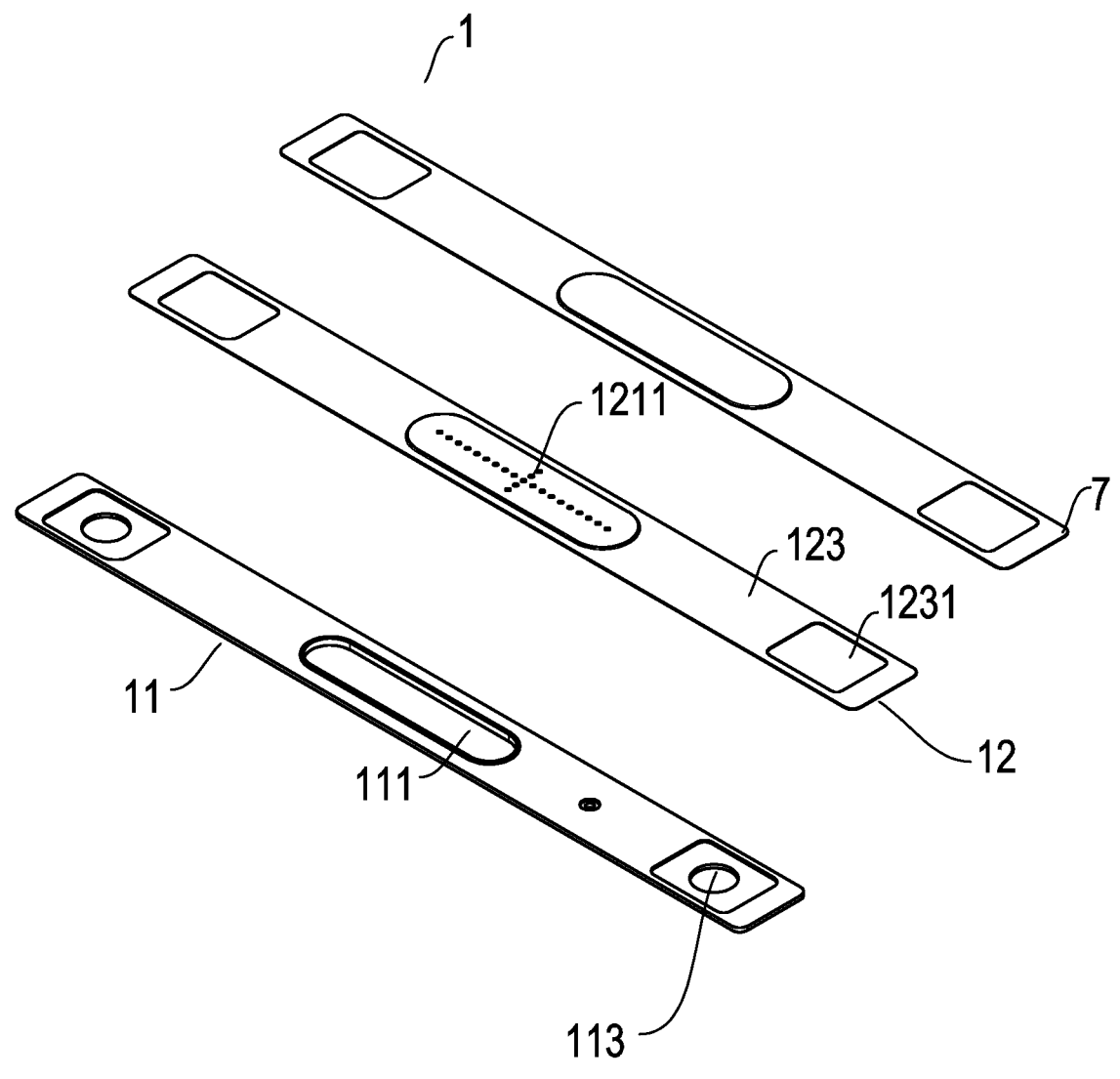
FIG. 4 is an exploded view of a cover according to an embodiment of the invention.

As shown in FIG. 3 and FIG. 4, a first hole 111 is formed on the cover body 11, and an explosion-proof valve 4 is installed in the first hole 111. The explosion-proof valve 4 may be a sheet structure bonded to the first hole 111. Two pole holes 113 are disposed on the cover body 11 for a positive pole 5 and a negative pole 6 to each pass through one of the pole holes 113 and protrude to be disposed on the cover 1, the positive pole 5 and the negative pole 6 are electrically connected to the battery core 3 inside the case 2. In the embodiment, the first hole 111 is disposed at the center of the cover body 11 in the length direction, and the pole holes 113 are symmetrically disposed on two sides of the first hole 111 and close to two ends of the cover 1 in the length direction. The first hole 111 is formed in an elongated shape with circular arcs at two ends, and the pole hole 113 is formed in a substantially rectangular shape. However, it is only for illustration, and those skilled in the art can arbitrarily adjust the relative configuration relationship, the shape, and the size of the first hole and the configured pole hole 113 according to actual requirements. The high temperature resistant sheet 12 is disposed on the upper surface of the cover body 11. The high temperature resistant sheet 12 has substantially the same shape as the cover body 11 and is fixedly bonded to the cover body 11. The high temperature resistant sheet 12 may be a mica sheet, a ceramic sheet, a glass sheet, or the like. The material of the high temperature resistant sheet includes one of glass fiber, mica, ceramic, and ceramic rubber. Preferably, the high temperature resistant sheet 12 has a thickness of 0.2 mm to 1 mm and can withstand a maximum temperature of 1000 degrees Celsius.

Preferably, as shown in FIG. 4, the high temperature resistant sheet 12 extends toward the second pole hole 113, and the high temperature resistant sheet 12 has through holes 1231 for the positive pole 5 and the negative pole 6 to pass therethrough. In some embodiments, the positive pole 5 or the negative pole 6 may not pass through the high temperature resistant sheet 12, that is, the high temperature resistant sheet 12 has short length and does not extend to where the positive pole 5 or the negative pole 6 are disposed.

When thermal runaway occurs in one of the batteries, the high temperature substances generated in the battery may be sprayed out from the first hole 111 to break through the weak portion of the high temperature resistant sheet 12. However, the high temperature resistant sheet 12 is further disposed on the cover 1 of the battery to cover the cover body 11, thereby preventing the high temperature substances from being in direct contact with the cover 1, so that the structure of the cover 1 may not be damaged. In addition, the high temperature resistant sheet 12 also covers the top of the first hole 111, which can prevent high temperature substances from getting inside the battery through the first hole 111 and reduce the probability of thermal runaway diffusion. That is, with such a cover in the invention, the normal operation of the original explosion-proof mechanism is ensured, the probability of chain diffusion of thermal runaway can be further reduced, and thereby the possibility of explosion or fire of the whole battery is reduced, improving the safety of the battery.

Optionally, as shown in FIG. 4, when the high temperature resistant sheet 12 is separated from the cover body 11, the high temperature resistant sheet 12 is a flat sheet. The thickness of the high temperature resistant sheet 12 ranges from 0.1 mm to 1 mm, which is relatively thin and allows the high temperature resistant sheet 12 to have a certain elasticity or deformation force, and the high temperature resistant sheet 12 bonded to the cover body 11 may not break after being deformed. It can be understood that, after the high temperature resistant sheet 12 is bonded to the cover body 11, it is also understood that there is slight deformation after being removed, and the original state of the high temperature resistant sheet 12 is a flat sheet. Preferably, the high temperature resistant sheet 12 can be an integrally formed element, that is, an integrally formed sheet.

Figure 5:
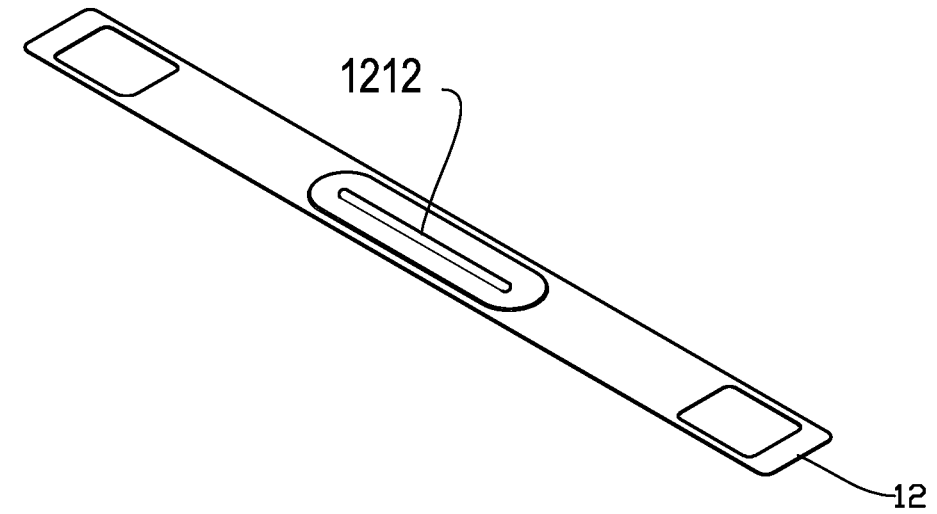
FIG. 5 is a schematic structural view of another high temperature resistant sheet according to an embodiment of the invention.

Furthermore, the high temperature resistant sheet 12 has a weak portion, and at least part of the orthographic projection of the weak portion along a direction perpendicular to the cover body 11 is seated in the first hole 111. The weak portion includes two intersecting linear structures, and the orthographic projection of the intersection of the two linear structures along a direction perpendicular to the cover body 11 is seated at the center of the first hole 111. FIG. 4 shows a linear structure formed by an arrangement of several holes 1211, but the disclosure is not limited thereto. In other embodiments, as the high temperature resistant sheet shown in FIG. 5, the weak portion can also be a linear crack 1212. Those skilled in the art can understand that the shape of the weak portion has not only the shape illustrated but also other shapes as long as the weak portion can easily break when the air pressure increases. More specifically, it is preferable that the weak portion is a structure that damages the high temperature resistant sheet 12 within the range of ¼ to ¾ of the thickness. The linear structure may be straight or curved, and the intersection point of the linear structure may not be at the center of the first hole 111. In addition, the number of bars is not limited to the two lines as shown. In other embodiments, the weak portion may be one linear structure or may be three or more linear structures. When there are two linear structures or more, the linear structures can also be parallel to each other or intersect on an extension line.

Since the weak portion of the high temperature resistant sheet 12 is located above the first hole 111, it can be broken under the condition of high temperature and high pressure inside the battery, forming a channel for the high temperature and high pressure inside the battery to be released to the outside, preventing the explosion of the battery and fire. That is, through the high temperature resistant sheet 12 of the invention, the explosion-proof valve of one battery and the original pressure relief function of the first hole 111 can be ensured to function normally and meanwhile can be prevented from being affected by the thermal runaway of other batteries which may result in chain reaction. The overall safety and stability of the battery has been improved.

Figure 6:
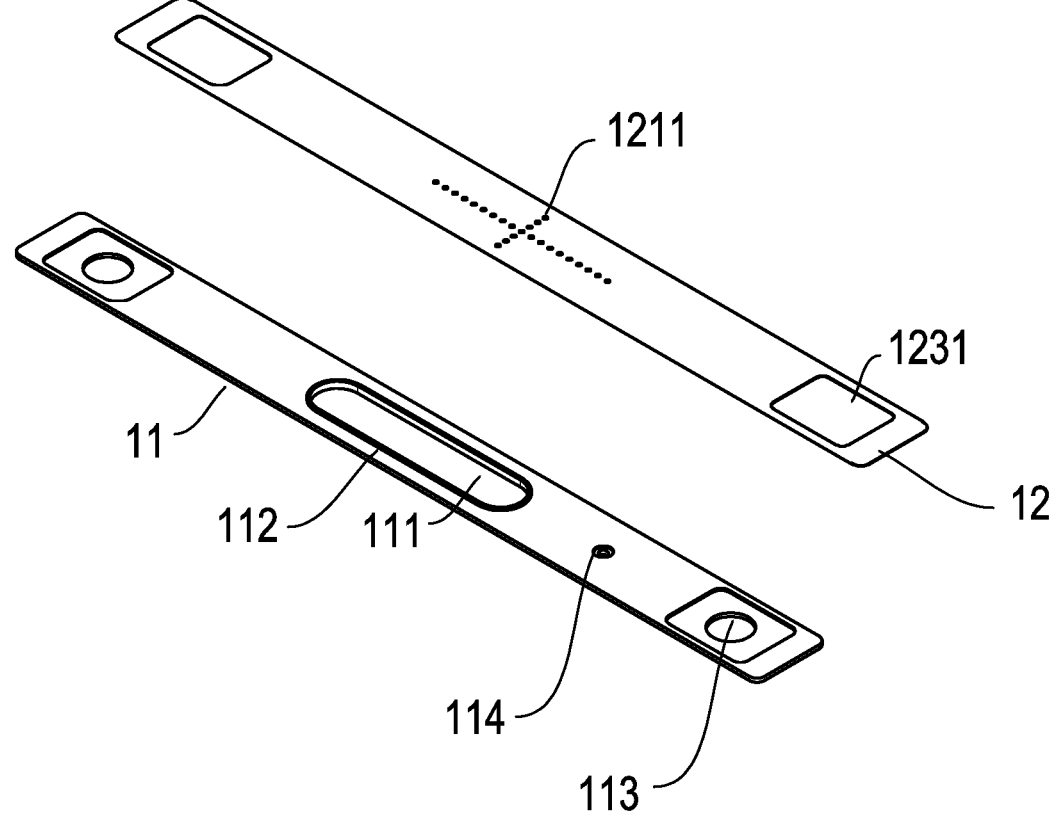
FIG. 6 is an exploded view of a cover body and a high temperature resistant sheet according to an embodiment of the invention.
Figure 7:
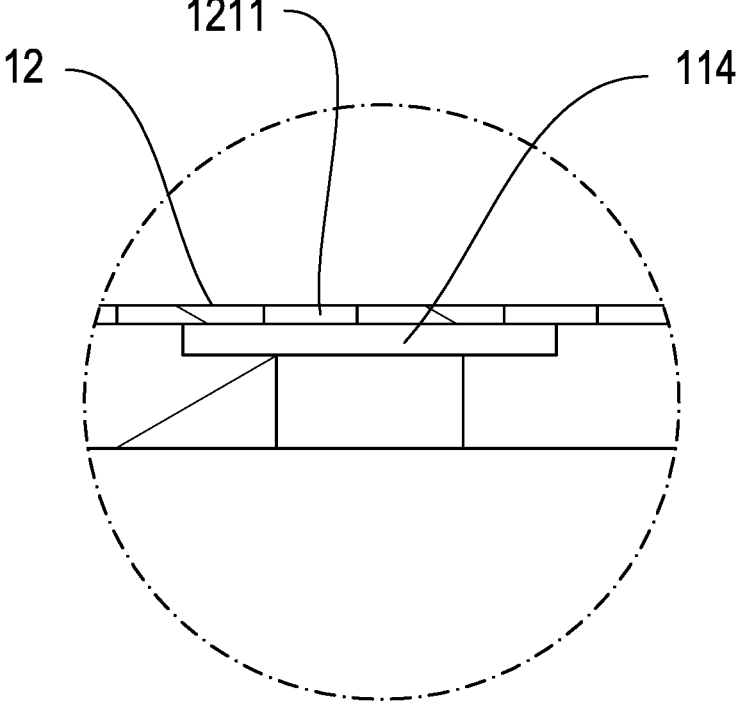
FIG. 7 is a partial cross-sectional view of another cover body bonded to a high temperature resistant sheet according to FIG. 6.

Further, the cover body 11 is further provided with a liquid injection hole 114. FIG. 6 is an exploded view of another high temperature resistant sheet and the cover body, and a part of the weak portion in FIG. 6 is above the liquid injection hole 114; FIG. 7 is a partial cross-sectional view of the high temperature resistant sheet and the cover body in FIG. 6. FIG. 7 illustrates the weak portion of the high temperature resistant sheet 12 is above the liquid injection hole 114, that is the hole 1211 is above the liquid injection hole 114. Accordingly, one of the two intersecting linear structures extends toward the top of the liquid injection hole 114 and is at least partially above the liquid injection hole 114, so that helium gas detection can also be performed after the high temperature resistant sheet 12 is disposed. In some embodiments, the linear structures without intersecting each other may also extend above the injection holes.

In addition, in other embodiments, the end points of the two linear structures extend to the edge of the high temperature resistant sheet in the width direction. The distance between the end point of the linear structure and the edge of the high temperature resistant sheet in the width direction is less than or equal to 5 mm, and the width direction of the high temperature resistant sheet is the width direction of the cover body 11. Those skilled in the art can understand that the end points of the two linear structures may also not extend to the edge of the high temperature resistant sheet in the width direction. It is understandable that the weak portion may be multiple linear structures and the number is not limited to two. All the linear structures are completely separated, or part of the linear structures may be separated.

Further, as shown in FIG. 3 and FIG. 4, the battery 100 further includes a protective layer 7. The protective layer 7 is a film with the same shape and substantially the same area as the upper surface of the high temperature resistant sheet 12 and is bonded to the upper surface of the high temperature resistant sheet 12.

In some embodiments, the overlapping area of the protective layer 7 and one side of the high temperature resistant sheet 12 facing away from the cover body 11 accounts for 50% to 100% of the area of the one side of the high temperature resistant sheet 12 facing away from the cover body 11. In FIG. 3 and FIG. 4, the overlapping area of the protective layer 7 and the one side of the high temperature resistant sheet 12 facing away from the cover body 11 accounts for 100% of the area of the one side of the high temperature resistant sheet 12 facing away from the cover body 11. Optionally, the overlapping area of the protective layer 7 and the one side of the high temperature resistant sheet 12 facing away from the cover body 11 accounts for 55%, 60%, 70%, 75% 80% or 90%, etc. of the area of the one side of the high temperature resistant sheet 12 facing away from the cover body 11. In other embodiments, the protective layer can cover the high temperature resistant sheet 12, that is, the side of the high temperature resistant sheet 12 facing the cover body, the side of the high temperature resistant sheet 12 facing away from the cover body 11, and the sides of the high temperature resistant sheet 12 are all covered by the protective layer 7. It is understandable that the protective layer 7 can also be boned to the side of the high temperature resistant sheet 12 facing the cover body and the side of the high temperature resistant sheet 12 facing away from the cover body 11.

In addition, the length of the protective layer 7 is greater than that of the high temperature resistant sheet 12, and two ends of the protective layer 7 along the length direction of the high temperature resistant sheet 12 extend beyond the high temperature resistant sheet 12 and are connected to the cover body. Specifically, the length of the high temperature resistant sheet 12 can be less than the length of the cover body, the protective layer 7 extends beyond the high temperature resistant sheet 12 and is bonded to the upper surface of the cover body 11, or the protective layer 7 extends out to be bonded to the side walls of the cover body. The protective layer 7 may also extend along the width direction of the cover body 11 to be connected to the cover body 11. That is, to well fix the protective layer 7, the protective layer at least partially extends beyond the high temperature resistant sheet and is connected to the cover body.

Figure 8:
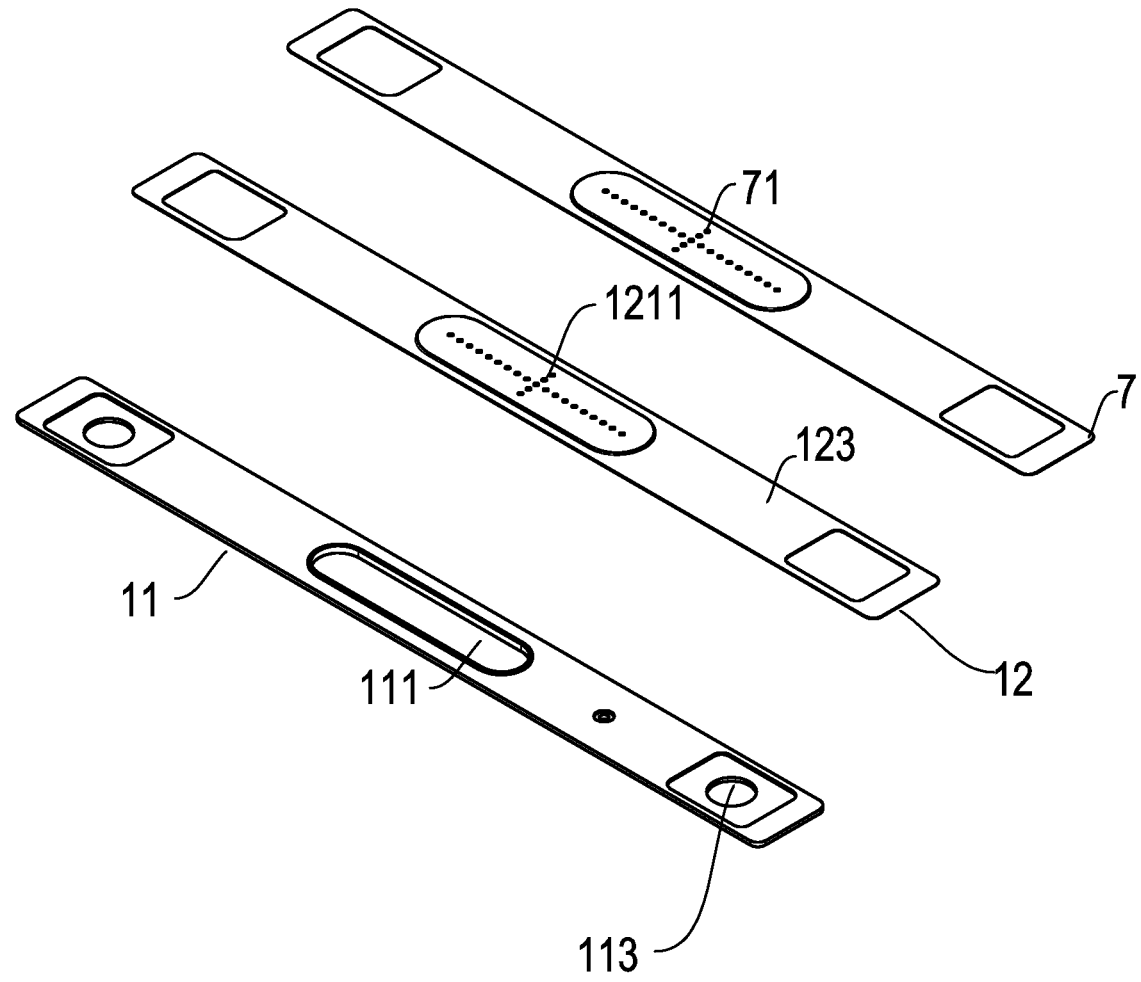
FIG. 8 is an exploded view of another cover according to an embodiment of the invention.

Further, as shown in FIG. 2 and FIG. 3, both the positive pole 5 and the negative pole 6 penetrate through the cover body 11, the high temperature resistant sheet 12, and the protective layer 7. In other embodiments, one of the positive pole 5 and the negative pole 6 penetrates through the cover body 11, the high temperature resistant sheet 12, and the protective layer 7. Further, in other embodiments, as shown in FIG. 8, the protective layer 7 is provided with a second hole 71, and the orthographic projection of the second hole 71 is located on the weak portion along a direction perpendicular to the cover body. Specifically, when the weak portion is a hole, the second hole 71 can also be a hole; when the weak portion is a crack, the second hole can also be a crack. As can be understood by those skilled in the art, the second hole may also be different in structure from the weak portion. In the example, no second hole is disposed on the protective layer 7.

Figure 9:
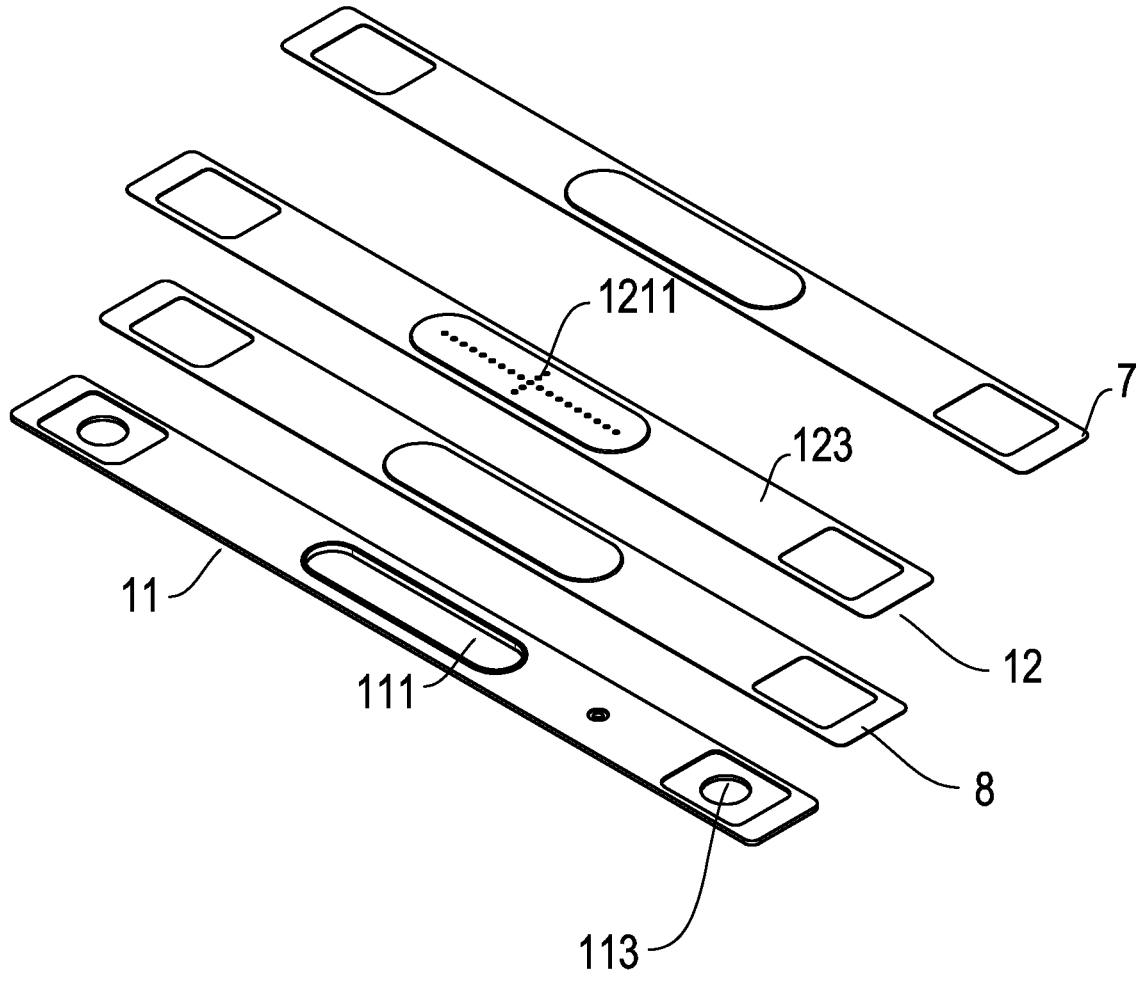
FIG. 9 is an exploded view of yet another cover according to an embodiment of the invention.

In some embodiments, as shown in FIG. 9, a protective layer 8 may also be disposed between the high temperature resistant sheet 12 and the cover body 11. The protective layer 8 is also called an intermediate protective layer. The high temperature resistant sheet 12 is connected to the cover body 11 through the protective layer 8. The structure of the protective layer 8 may be similar to that of the protective layer 7, which may not be illustrated in detail herein.

Optionally, the protective layer 7 and the protective layer 8 are plastic films. When the weak portion of the high temperature resistant sheet 12 is broken, the protective layer 7 and the protective layer 8 may also be broken by internal pressure, which may not affect the breaking function.

Figure 10:
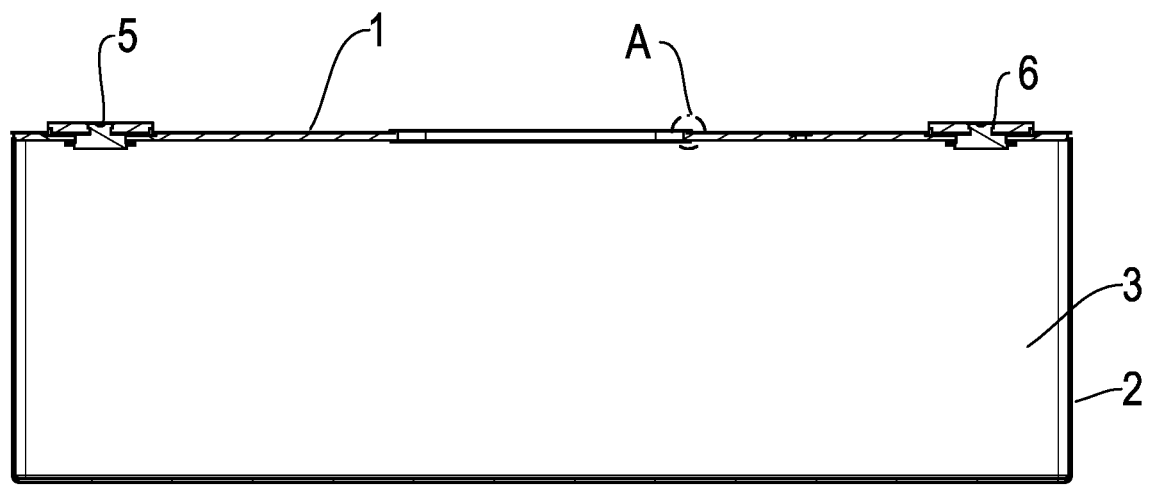
FIG. 10 is a cross-sectional view of a battery according to an embodiment of the invention.
Figure 11:
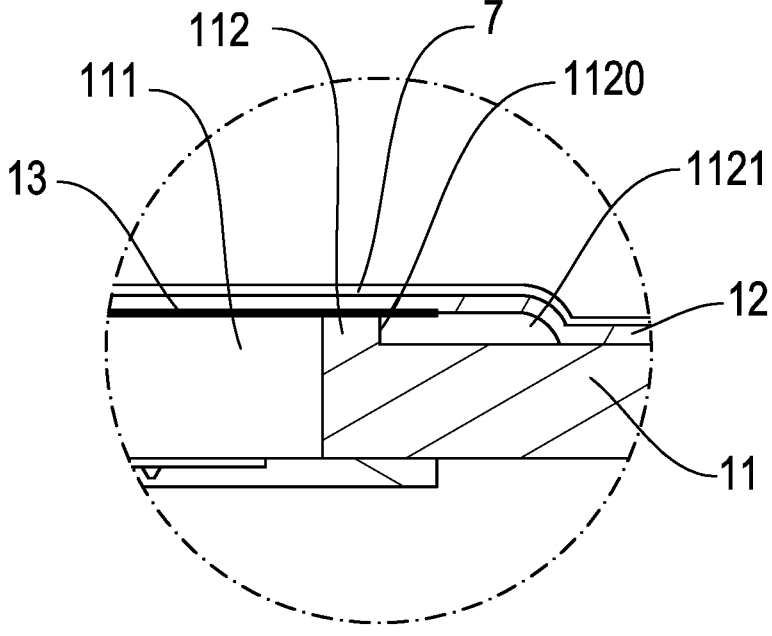
FIG. 11 is a partial enlarged view of A in FIG. 10.

Further, in the embodiment, as shown in FIG. 6, a boss 112 is disposed around the peripheral of the first hole 111 of the cover body 11. Specifically, as shown in FIG. 10 and FIG. 11, after the high temperature resistant sheet 12 covers the cover body 11, the boss 112 may bear against the high temperature resistant sheet 12, so that the high temperature resistant sheet 12 partially protrudes, and a gap 1121 is defined between the high temperature resistant sheet 12 and the outer side walls 1120 of the boss 112. In some embodiments, no bosses are disposed on the cover body 11, and the high temperature resistant sheet 12 can be applied to more types of the cover body 11.

When there is the boss 112, the high temperature resistant sheet 12 which is a flat sheet in the initial state is used to be disposed on the cover body 11. The high temperature resistant sheet 12 may well cooperate with the cover body and may be easily configured even with the presence of the boss.

Further, as shown in FIG. 11, a distance from a junction between the boss 112 and an upper surface of the cover body 11 to the high temperature resistant sheet 12 is 1 mm to 2 mm is 1 mm to 2 mm. Optionally, the distance from a junction between the boss 112 and an upper surface of the cover body 11 to the high temperature resistant sheet 12 is 1 mm to 2 mm may be 1.2 mm, 1.4 mm, 1.6 mm, or 1.8 mm.

Figure 12:
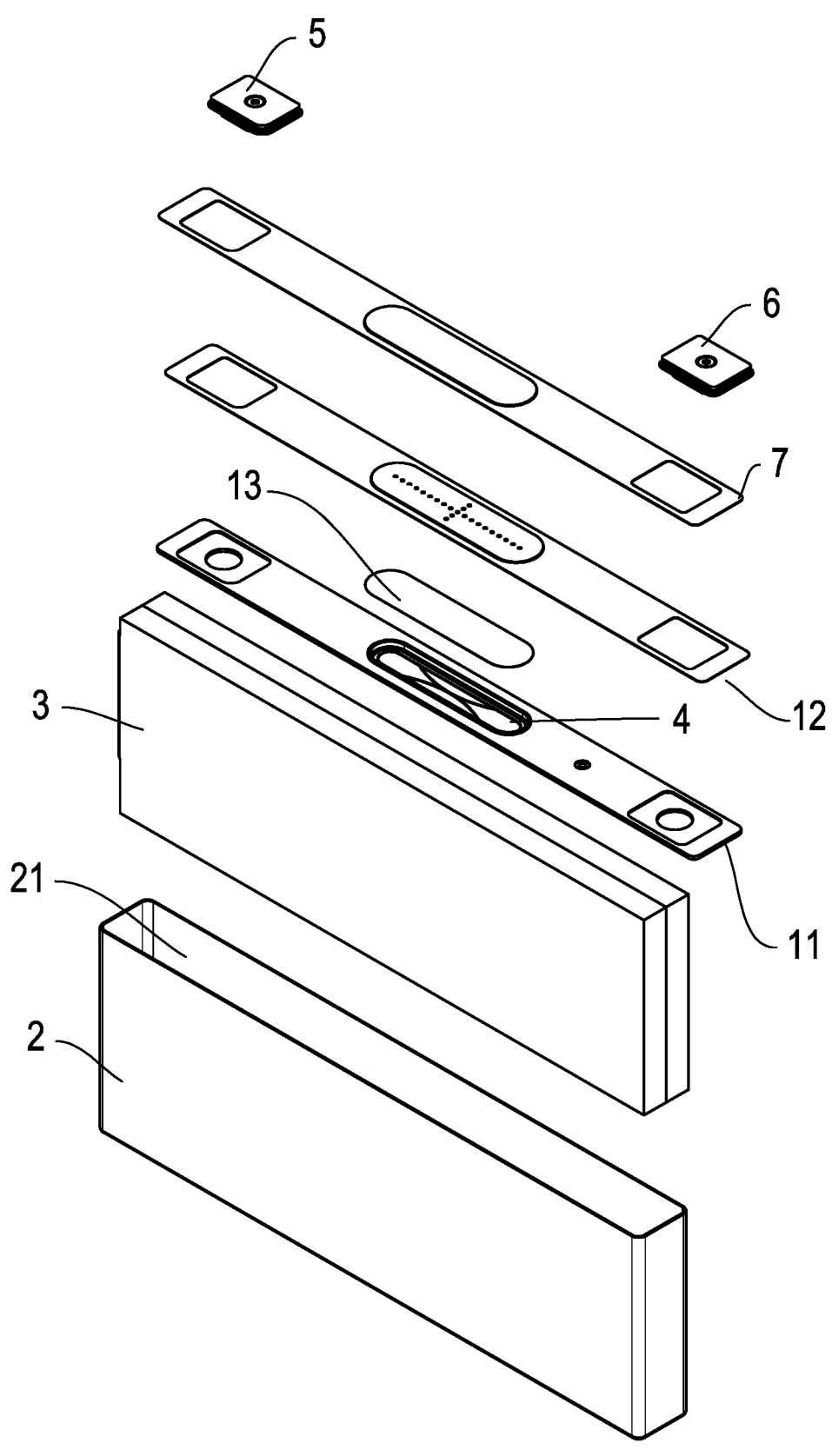
FIG. 12 is an exploded view of another battery according to an embodiment of the invention.

Further, as shown in FIG. 12, the cover 1 further includes a protective film 13 covering the first hole 111, and the high temperature resistant sheet 12 covers the protective film 13. The protective film 13 forms further protection on the first hole 111 without interfering the normal explosion-proof and pressure relief of the battery. The protective film 13 may be a plastic film, a silicone mold, or the like. In some embodiments, there may also be no protective film.

To solve the technical problems on the battery, an embodiment of the invention provides a battery, including: a case, having an opening; a battery core, disposed in the case; and a cover, covering the opening of the case; wherein the cover includes. The cover includes a cover body provided with a first hole and a high temperature resistant sheet disposed on a top of the cover body and covering the first hole.

Compared with the conventional technology, the embodiments of the invention are configured with a high temperature resistant sheet on the cover body of the battery, and the high temperature resistant sheet covers the cover body, so high temperature substances of other batteries can be prevented from entering through the first hole, and thereby in the case of thermal runaway of one battery, other batteries are prevented from being affected without causing chain thermal runaway, and the probability of thermal runaway diffusion is reduced.

In one embodiment, the high temperature resistant sheet includes a weak portion, and at least part of the orthographic projection of the weak portion along a direction perpendicular to the cover body is seated in the first hole.

In one embodiment, the battery further includes a protective layer. The protective layer covers one side of the high temperature resistant sheet facing away from the cover body, and the overlapping area of the protective layer and the side of the high temperature resistant sheet facing away from the cover body accounts for 50% to 100% of the area of the one side of the high temperature resistant sheet facing away from the cover body.

In one embodiment, the protective layer at least partially extends beyond the high temperature resistant sheet and is connected to the cover body.

In one embodiment, the length of the protective layer is greater than that of the high temperature resistant sheet, and two ends of the protective layer along the length direction of the high temperature resistant sheet extend beyond the high temperature resistant sheet and are connected to the cover body.

In addition/alternatively, the width of the protective layer is greater than the width of the high temperature resistant sheet, and two ends of the protective layer along the width direction of the high temperature resistant sheet extend beyond the high temperature resistant sheet and are connected to the cover body.

In one embodiment, the protective layer is a plastic film; the high temperature resistant sheet is a mica sheet or a glass sheet.

In one embodiment, the high temperature resistant sheet includes a weak portion, and at least part of the orthographic projection of the weak portion along a direction perpendicular to the cover body is seated in the first hole.

The protective layer is provided with a second hole, and the orthographic projection of the second hole is located on the weak portion along a direction perpendicular to the cover body.

In one embodiment, the battery includes a pole. The pole is electrically connected to the battery core and penetrates through the cover body, the high temperature resistant sheet, and the protective layer.

In one embodiment, the weak portion includes cracks or multiple holes. When the weak portion is multiple linear structures, at least two of the linear structures intersect or extension lines thereof intersect.

In one embodiment, an orthographic projection of an intersection of the two intersecting linear structures along a direction perpendicular to the cover body is seated on the first hole.

In one embodiment, the cover body is further provided with a liquid injection hole; and a part of at least one of the linear structures is located above the liquid injection hole.

In one embodiment, the battery further includes an intermediate protective layer, the intermediate protective layer is located between the high temperature resistant sheet and the cover body, and the high temperature resistant sheet is connected to the cover body through the intermediate protective layer.

In one embodiment, the high temperature resistant sheet is an integrally formed element. In one embodiment, when the high temperature resistant sheet is separated from the cover body, the high temperature resistant sheet is a flat sheet.

In one embodiment, a boss is disposed around the peripheral of the first hole of the cover body; a gap is defined between the high temperature resistant sheet and the outer side walls of the boss.

In one embodiment, a distance from a junction between the boss and an upper surface of the cover body to the high temperature resistant sheet is 1 mm to 2 mm is 1 mm to 2 mm.

In one embodiment, the first hole is further covered by a protective film, and the high temperature resistant sheet covers the protective film.

The embodiments of the invention provide an electronic device including the illustrated battery.

The preferred embodiments of the invention have been described in detail. However, it is to be understood that if desired, other embodiments can be provided by modifying aspects of the embodiments through adopting aspects, features and conceptions of various patents, application, and publications.

These and other changes can be made to the embodiments in light of the detailed description in light of the foregoing paragraphs. In general, in the claims, the terms used should not be interpreted as limiting the specific embodiments disclosed in the specification and the claims and should be interpreted to include all possible embodiments, along with all equivalent scope to which these claims are entitled.

Those skilled in the art shall understand that the embodiments are specific examples for implementing the invention. In practical applications, various changes can be made to the form and details without departing from the spirit and the scope of the invention.

What is claimed is:

1. A battery, comprising:
a case, having an opening;
a battery core, disposed in the case; and
a cover, covering the opening of the case, and an explosion-proof valve is installed in the first hole;
wherein the cover comprises:
  a cover body, provided with a first hole; and
  a high temperature resistant sheet, disposed on a top of the cover body and covering the first hole, wherein the high temperature resistant sheet is fixedly bonded to an upper surface of the cover body and comprises a weak portion, at least part of an orthographic projection of the weak portion along a direction perpendicular to the cover body is seated in the first hole.

2. The battery according to claim 1, wherein the battery further comprises a protective layer, the protective layer covers one side of the high temperature resistant sheet facing away from the cover body, and an overlapping area of the protective layer and the one side of the high temperature resistant sheet facing away from the cover body accounts for 50% to 100% of an area of the one side of the high temperature resistant sheet facing away from the cover body.

3. The battery according to claim 2, wherein the protective layer at least partially extends beyond the high temperature resistant sheet and is connected to the cover body.

4. The battery according to claim 2, wherein a length of the protective layer is greater than a length of the high temperature resistant sheet, and two ends of the protective layer along a length direction of the high temperature resistant sheet extend beyond the high temperature resistant sheet and are connected to the cover body; and/or
  a width of the protective layer is greater than a width of the high temperature resistant sheet, and two ends of the protective layer along a width direction of the high temperature resistant sheet extend beyond the high temperature resistant sheet and are connected to the cover body.

5. The battery according to claim 2, wherein the protective layer is a plastic film; the high temperature resistant sheet is a mica sheet or a glass sheet.

6. The battery according to claim 2, wherein the high temperature resistant sheet comprises a weak portion, and at least part of an orthographic projection of the weak portion along a direction perpendicular to the cover body is seated in the first hole;
  the protective layer is provided with a second hole, and an orthographic projection of the second hole is located on the weak portion along a direction perpendicular to the cover body.

7. The battery according to claim 2, wherein the battery comprises a pole, and the pole is electrically connected to the battery core and penetrates through the cover body, the high temperature resistant sheet, and the protective layer.

8. The battery according to claim 1, wherein the weak portion comprises a crack or a plurality of holes, and when the weak portion is a plurality of linear structures, at least two of the linear structures intersect or extension lines thereof intersect.

9. The battery according to claim 8, wherein an orthographic projection of an intersection of the two intersecting linear structures along a direction perpendicular to the cover body is seated on the first hole.

10. The battery according to claim 8, wherein the cover body is further provided with a liquid injection hole; and a part of at least one of the linear structures is located above the liquid injection hole.

11. The battery according to claim 1, wherein the battery further comprises an intermediate protective layer, the intermediate protective layer is located between the high temperature resistant sheet and the cover body, and the high temperature resistant sheet is connected to the cover body through the intermediate protective layer.

12. The battery according to claim 1, wherein the high temperature resistant sheet is an integrally formed element.

13. The battery according to claim 1, wherein when the high temperature resistant sheet is separated from the cover body, the high temperature resistant sheet is a flat sheet.

14. The battery according to claim 1, wherein a boss is disposed around a peripheral of the first hole of the cover body; a gap is defined between the high temperature resistant sheet and outer side walls of the boss.

15. The battery according to claim 14, wherein a distance from a junction between the boss and an upper surface of the cover body to the high temperature resistant sheet is 1 mm to 2 mm.

16. The battery according to claim 1, wherein the first hole is further covered by a protective film, and the high temperature resistant sheet covers the protective film.

17. An electronic device, comprising:
a battery, comprising:
a case, having an opening;
a battery core, disposed in the case; and
a cover, covering the opening of the case, and an explosion-proof valve is installed in the first hole;
  wherein the cover comprises:
    a cover body, provided with a first hole; and
    a high temperature resistant sheet, disposed on a top of the cover body and covering the first hole, wherein the high temperature resistant sheet is fixedly bonded to an upper surface of the cover body and comprises a weak portion, at least part of an orthographic projection of the weak portion along a direction perpendicular to the cover body is seated in the first hole.

* * * * *